US005548955A

United States Patent [19]

Sandefur et al.

[11] Patent Number: 5,548,955
[45] Date of Patent: Aug. 27, 1996

[54] CATALYTIC CONVERTER HAVING A VENTURI FORMED FROM TWO STAMPED COMPONENTS

[75] Inventors: Parrish A. Sandefur, Elm Grove; William M. Kindness, Wauwatosa, both of Wis.

[73] Assignee: Briggs & Stratton Corporation, Wauwatosa, Wis.

[21] Appl. No.: 326,035

[22] Filed: Oct. 19, 1994

[51] Int. Cl.[6] .................................................. F01N 3/28
[52] U.S. Cl. ............................... 60/299; 60/308; 422/180
[58] Field of Search .......................... 60/299, 308, 316, 60/319; 422/180, 179

[56] References Cited

U.S. PATENT DOCUMENTS

| | | | |
|---|---|---|---|
| 3,613,359 | 10/1971 | Posh et al. ................................ | 60/30 |
| 3,677,728 | 5/1971 | Von Brimer et al. ..................... | 60/30 |
| 3,712,065 | 1/1973 | Hurst ......................................... | 60/274 |
| 3,857,458 | 12/1974 | Ohtani ...................................... | 60/319 |
| 3,982,396 | 9/1976 | Suzuki ..................................... | 60/282 |
| 4,094,645 | 6/1978 | Bailey ...................................... | 60/299 |
| 4,197,704 | 4/1980 | Date et al. ............................... | 60/322 |
| 4,206,177 | 6/1980 | Otsubo et al. .......................... | 422/171 |
| 4,209,493 | 6/1980 | Olson ....................................... | 60/308 |
| 4,231,221 | 11/1980 | Mäthner .................................. | 181/240 |
| 4,393,652 | 7/1983 | Munro ...................................... | 60/295 |
| 4,420,933 | 12/1983 | Kajitani et al. .......................... | 60/302 |
| 4,541,240 | 9/1985 | Munro ...................................... | 60/295 |
| 4,559,776 | 12/1985 | Arai et al. ................................ | 60/280 |
| 4,601,168 | 7/1986 | Harris ....................................... | 60/299 |
| 4,797,263 | 1/1989 | Oza ........................................... | 422/176 |
| 4,894,987 | 1/1990 | Harwood et al. . | |
| 4,916,897 | 4/1990 | Hayashi et al. ......................... | 60/286 |
| 5,016,438 | 5/1991 | Harris ....................................... | 60/299 |
| 5,062,263 | 11/1991 | Carboni ................................... | 60/299 |
| 5,103,641 | 4/1992 | Maus et al. .............................. | 60/299 |
| 5,134,849 | 8/1992 | McWhorter .............................. | 60/304 |
| 5,138,834 | 8/1992 | Maund et al. ........................... | 60/276 |
| 5,150,573 | 9/1992 | Maus et al. .............................. | 60/299 |
| 5,185,998 | 2/1993 | Brew ........................................ | 60/299 |
| 5,220,789 | 6/1993 | Riley et al. .............................. | 60/302 |
| 5,431,013 | 7/1995 | Yamaki .................................... | 60/308 |

*Primary Examiner*—Douglas Hart
*Attorney, Agent, or Firm*—Michael, Best & Friedrich

[57] ABSTRACT

The catalytic muffler for small internal combustion engines has a venturi with a flattened profile formed from two stamped pieces, namely the muffler housing and the separator plate. This design eliminates the need for a separate piece of tubing or machined part, as is required in prior art round venturi devices. The catalytic muffler also includes a noise attenuator disposed upstream of the catalyst, thereby eliminating the back pressure which is otherwise applied to the venturi when the noise attenuator is disposed downstream of the catalyst. In addition, back pressure on the venturi is reduced by sizing the port in the separator plate and the exhaust port so that their respective cross sectional areas are substantially equal to the cross sectional area of the catalyst.

16 Claims, 3 Drawing Sheets

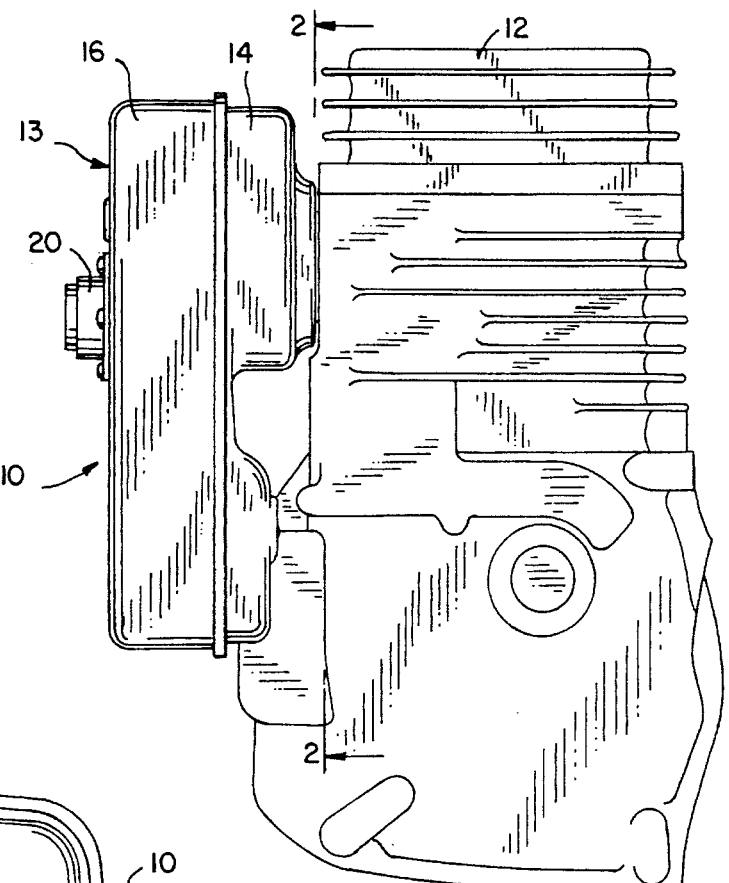
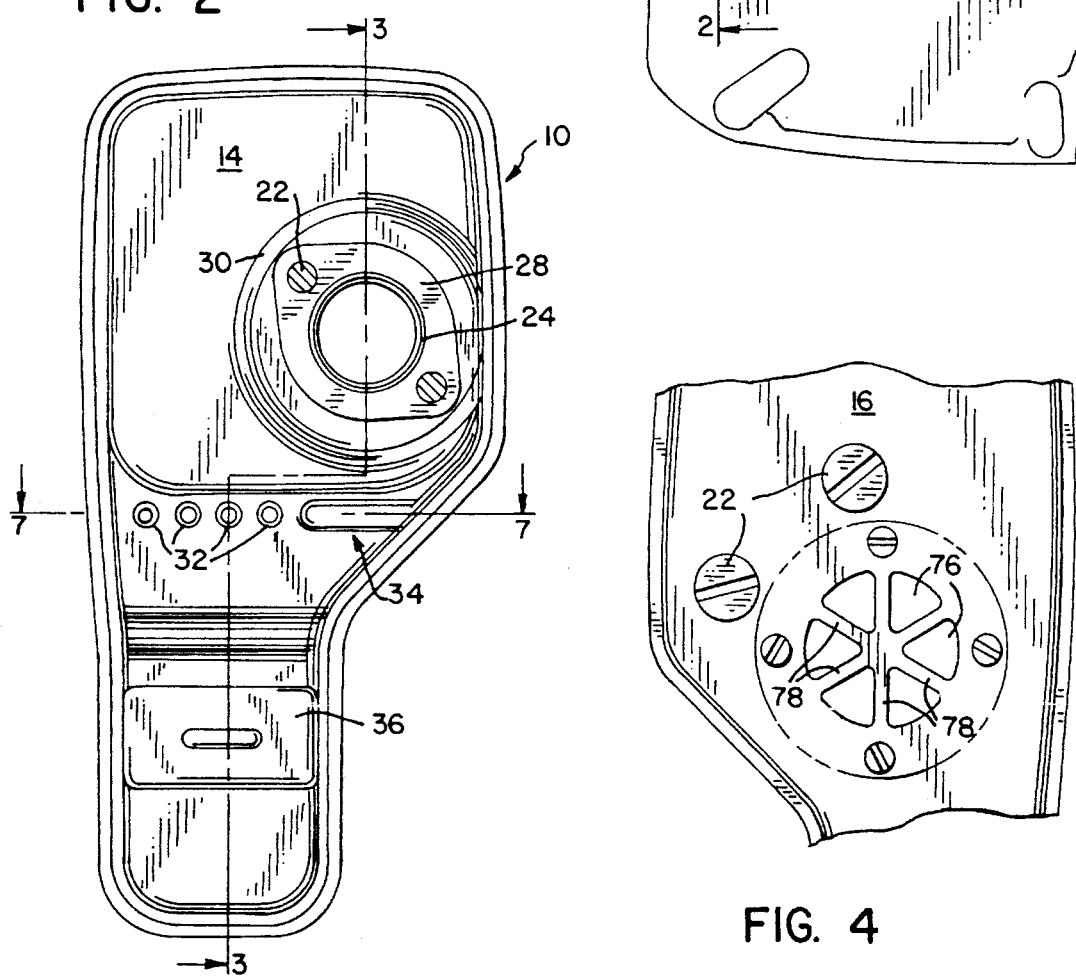
FIG. 1
FIG. 2
FIG. 4

FIG. 6
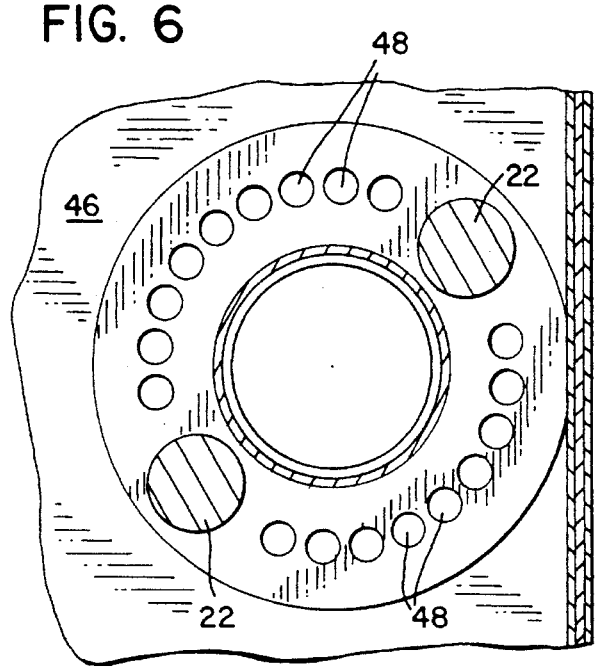
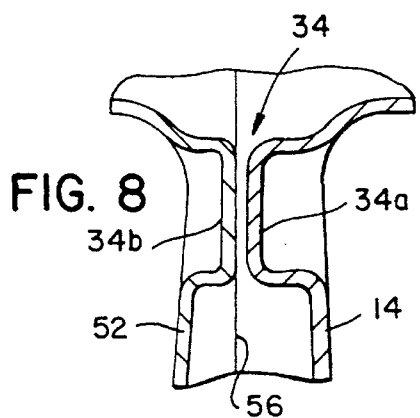
FIG. 8
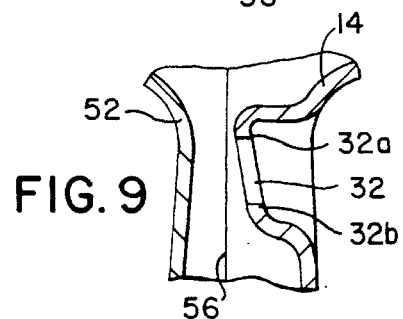
FIG. 9
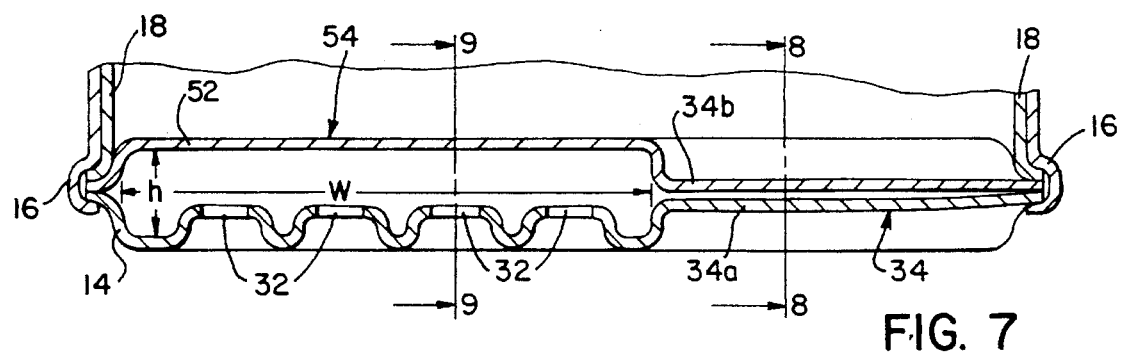
FIG. 7
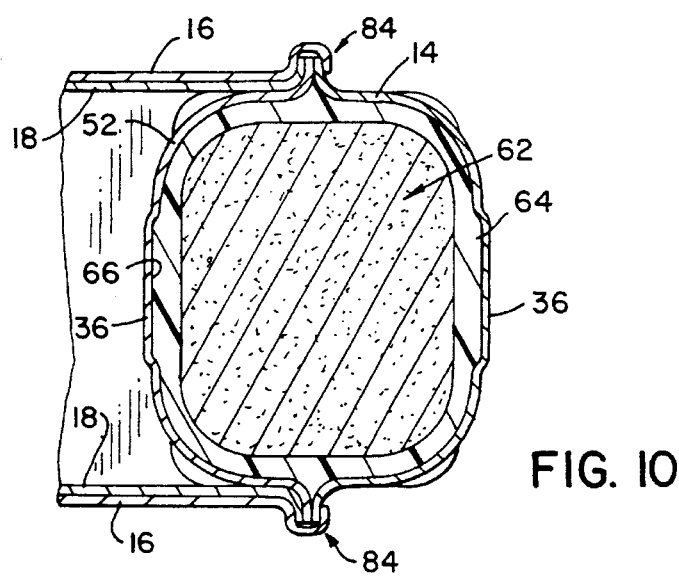
FIG. 10

CATALYTIC CONVERTER HAVING A VENTURI FORMED FROM TWO STAMPED COMPONENTS

BACKGROUND OF THE INVENTION

This invention relates to catalytic converters used to treat the exhaust emissions of internal combustion engines. More particularly, this invention relates to catalytic mufflers used on small internal combustion engines that power lawnmowers, snowblowers, generators and the like.

Recent governmental regulations require that the exhaust emissions of small internal combustion engines be substantially reduced. One way to reduce the exhaust emissions is to use a catalytic converter to treat the exhaust emissions of the engine. For small internal combustion engines, it is often desirable to combine the catalytic converter with a muffler into a single, compact unit.

A catalytic converter or a catalytic muffler represents a substantial increase in the total cost of the lawnmower, snowblower, or generator to which it is added. Therefore, it is desirable to decrease the cost of catalytic converters and catalytic mufflers to the extent possible.

Typical prior art catalytic converters have a venturi device that is substantially circular in the cross-sectional plane which is transverse to the direction of movement of the exhaust gases through it. Although these circular venturi devices are relatively efficient and effective in mixing secondary air with the exhaust gases, they are expensive to manufacture. Such venturi devices require a specially formed, separate piece of tubing or a machined part to yield a round venturi passageway. When catalytic converters and catalytic mufflers are made in large volumes, the savings achieved by eliminating this round venturi device are quite substantial.

Typical prior art catalytic mufflers have a noise attenuator that is disposed downstream of the catalyst. In these arrangements, undesirable back pressure is applied to the venturi, which minimizes secondary air induction and reduces the catalytic reaction. This back pressure reduces the throughput and thus the efficiency of the catalyst.

SUMMARY OF THE INVENTION

A catalytic converter is disclosed for treating the exhaust gases of an internal combustion engine which is less expensive and easier to manufacture than prior art catalytic converters.

The catalytic converter according to the present invention includes a stamped housing having an interior surface. Disposed within the housing are a means for receiving exhaust gases from the engine, a stamped member that divides the interior of the housing into at least two internal chambers, a venturi device, a catalyst disposed downstream of the venturi, and a means for outputting the exhaust gases after they have passed through the catalyst.

The venturi device according to the present invention is unique in that it has a flattened profile and is formed from two stamped pieces, thereby eliminating the round, separate piece required in prior art venturi devices. In the preferred embodiment of the present invention, the venturi device has a first sidewall which consists of a portion of the interior surface of the converter housing, and an opposite second sidewall which consists of a portion of the dividing member. Thus, the venturi device according to the present invention is formed out of existing components, avoiding the need for any additional parts.

Also in the preferred embodiment, the venturi device has a flattened profile such that the width dimension of the venturi is substantially larger than the height dimension of the venturi, on the order of 4 to 50 times greater. The venturi also includes one or more apertures in the second sidewall through which secondary air is drawn.

Also in the preferred embodiment, the catalytic converter is a catalytic muffler that includes a noise attenuation means disposed inside the converter housing and upstream of the catalyst. This arrangement reduces the back pressure on the venturi.

The back pressure on the venturi is also reduced by sizing the exhaust gas output means and a baffle port such that each has a cross-sectional area that is substantially equal to the cross-sectional area of the catalyst.

It is a feature and advantage of the present invention to decrease the cost of a catalytic converter.

It is another feature and advantage of the present invention to reduce the cost and complexity of a venturi device in a catalytic converter.

It is yet another feature and advantage of the present invention to reduce the back pressure on the venturi, thereby increasing the efficiency of exhaust gas conversion.

These and other features and advantages of the present invention will be apparent to those skilled in the art from the following detailed description of the preferred embodiments, and the drawings, in which:

BRIEF DESCRIPTION OF THE DRAWINGS

FIG. 1 is a side view of a catalytic muffler according to the present invention attached to a small internal combustion engine.

FIG. 2 is an end view of the inlet end of the catalytic muffler, taken along line 2—2 of FIG. 1.

FIG. 3 is a cross-sectional side view of the catalytic muffler according to the present invention, taken along line 3—3 of FIG. 2.

FIG. 4 is a fragmentary view depicting the outlet of the catalytic muffler.

FIG. 6 is a cross-sectional view depicting the outlet of the noise attenuator, taken along line 6—6 of FIG. 3.

FIG. 7 is a cross-sectional top view of the venturi device according to the present invention, taken along line 7—7 of FIG. 2.

FIG. 8 is an enlarged view of a portion of a dam through which exhaust gases cannot pass, taken along line 8—8 of FIG. 7.

FIG. 9 is an enlarged view of a portion of the venturi device depicting a secondary air aperture, taken along line 9—9 of FIG. 7.

FIG. 10 is a cross-sectional top view of the catalyst, taken along line 10—10 of FIG. 3.

DETAILED DESCRIPTION OF THE PREFERRED EMBODIMENT

Figure 5:
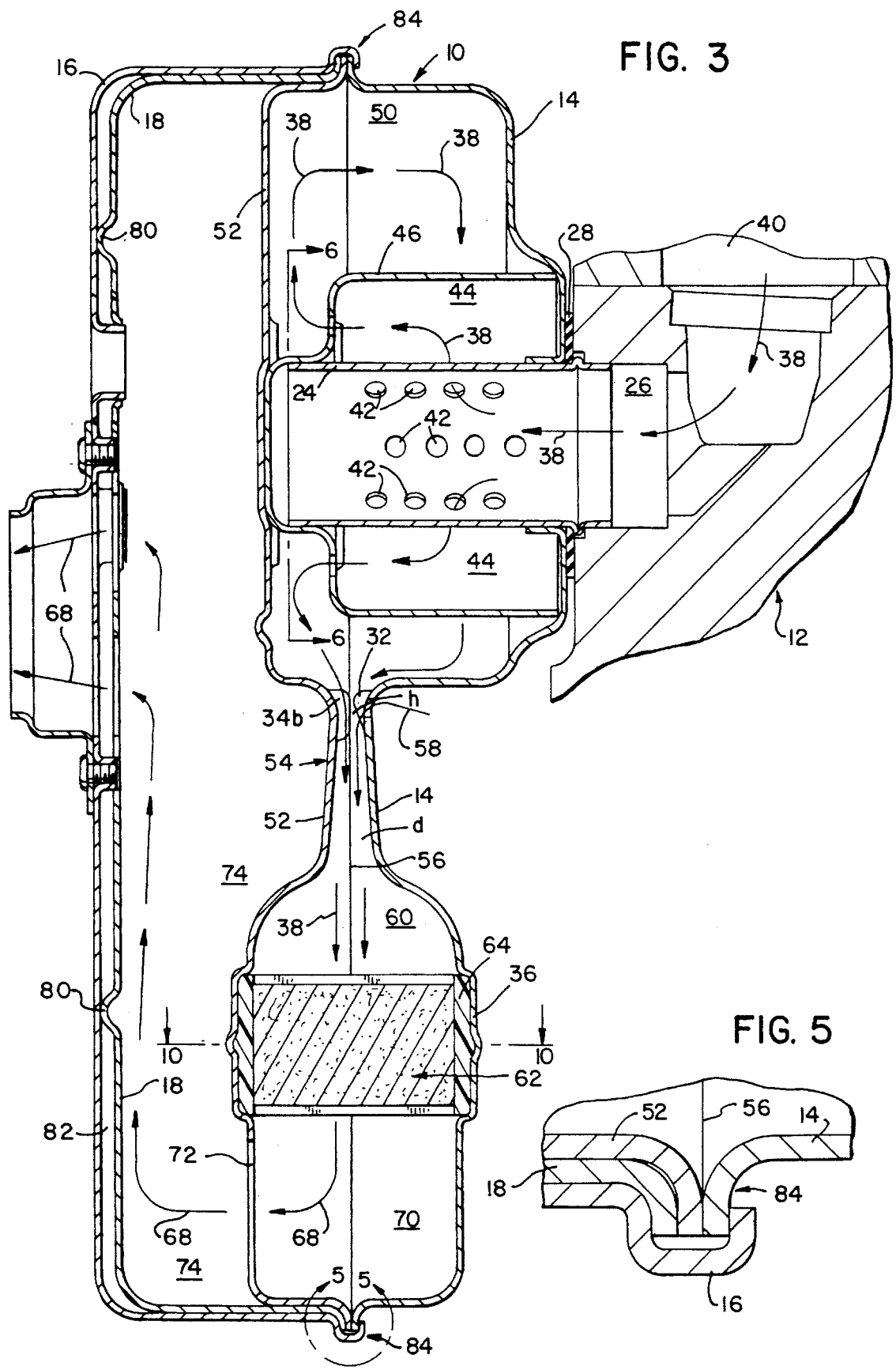
FIG. 5 is an enlarged view of the junction between the muffler body, the separator plate, and the muffler cover, taken along line 5—5 of FIG. 3.

FIG. 1 is a side view of a catalytic muffler 10 affixed to a small internal combustion engine 12. Catalytic muffler 10 is affixed to engine 12 by through-bolts 22 (FIGS. 2 and 4).

Although the preferred embodiment of the invention is a catalytic muffler, it is to be understood that the present invention could be used with a catalytic converter which does not have any noise attenuation feature.

In FIG. 1, catalytic muffler 10 has a converter housing 13 consisting of a converter body 14 and a heat shield 16. The heat shield is optional; it could be eliminated altogether so that a muffler cover 18 (FIG. 3) would act as the outer housing for the catalytic converter.

Attached to the output of catalytic muffler 10 is an optional deflector 20 which directs the treated exhaust gases into a more uniform flow.

FIG. 2 is a side view of catalytic muffler 10 from the side which faces engine 12 (FIG. 1). In FIG. 2, catalytic muffler 10 has an inlet 24 that is affixed to exhaust port 26 (FIG. 3) of engine 12. A gasket 28 provides the seal between inlet 24 and exhaust port 26. Catalytic muffler 10 also includes a raised, substantially circular ridge 30 that insures that catalytic muffler 10 is properly spaced from engine 12.

Referring again to FIG. 2, converter body 14 includes a plurality of apertures 32 therein through which secondary air is drawn, as more fully discussed below in connection with FIGS. 3, 7 and 9.

In FIG. 2, the converter also includes a dam 34 that prevents exhaust gases from entering the catalyst from a side angle. Dam 34 is best shown in FIG. 8.

Also formed within converter body 14 is a locking mechanism 36 that is used to retain the catalyst in place, as more fully discussed below in connection with FIGS. 3 and 10.

FIG. 3 is a cross-sectional side view that depicts the internal structure of catalytic muffler 10 as well as the flow of gases therethrough. In FIG. 3, untreated exhaust gases, represented by arrows 38, leave engine combustion chamber 40 and pass into exhaust port 26 of engine 12. The exhaust gases then proceed into an inlet muffler tube 24 which has a plurality of apertures 42 therein. After passing through apertures 42, exhaust gases 38 pass into an expansion chamber 44, which is enclosed by a baffle member 46. Baffle member 46 has a plurality of spaced apertures 48 therein, through which untreated exhaust gases 38 pass.

FIG. 6 depicts a portion of baffle member 46 and apertures 48 disposed therein. Gases 38 then proceed into another expansion chamber 50, which is defined by an interior surface of muffler body 14, baffle member 46, and a stamped separator plate 52.

Inlet tube 24, apertures 42, expansion chamber 44, baffle member 46, apertures 48 and second expansion chamber 50 together provide noise attenuation to reduce the noise of exhaust gases 38.

In chamber 50, exhaust gases 38 are forced to make at least one major turn, and then continue to be forced into a venturi device 54. Venturi device 54 is formed by two stamped components, namely a portion of converter body 14 and separator member 52. The function of separator member 52 is to divide the catalytic converter into a plurality of internal chambers.

As more fully discussed below, venturi device 54 is substantially less expensive to manufacture when compared to typical prior art venturi devices because no extra components are required to form venturi 54. The venturi according to the present invention is formed out of two stamped components which would be found in the catalytic converter in any event, thereby eliminating the need for a machined part or tubing that is typically required in prior art round venturi.

Venturi 54 has an opening on the convergent or input side that is very small, on the order of 0.2 inches or less in height. In a preferred embodiment, this height, depicted as h in FIG. 3, is approximately 0.158 inches.

Venturi 54 also includes a diverging section d downstream of height h. Diverging section d of the venturi has a diverging central angle of between about 6° to 12° with 4° to 8° being preferred. In FIG. 3, line 56 represents the centerline of venturi 54. Line 56 is also the centerline between converter body 14 and member 52.

As shown in FIG. 3, secondary air, represented by arrows 58, is drawn through apertures 32 so that mixing of exhaust gases 38 and secondary air 58 occurs in diverging section d. In the preferred embodiment described herein, each of apertures 32 has a diameter of 0.152 inches. The mixing of air 58 and exhaust gases 38 also occurs in an expansion chamber 60 disposed downstream of venturi 54. The exhaust gas/secondary air mixture proceeds into a monolithic catalyst bed 62 that is used to treat the exhaust gases to lessen the noxious hydrocarbon, carbon monoxide, and/or nitrous oxide emissions from the exhaust gases.

Monolithic catalyst 62 includes a honeycomb-type catalytic bed, made from silicon oxide, alumina oxide and magnesium. A washcoat is applied to the bed, to which is applied a catalytic composition consisting of about 1% of platinum, 0.5% of palladium and 0.25% of rhodium. Disposed around the catalytic bed is a mat 64, which in combination with locking mechanism 36, retains catalyst 62 in place. As best shown in FIG. 10, mat 64 encircles catalyst 62, and is partially disposed within recesses 66 of locking mechanism 36. The expansion of mat 64 into recesses 66 prevents catalyst 62 disposed within mat 64 from being carried downstream and out of position due to the pressure applied by exhaust gases 38.

Untreated exhaust gases 38 are treated within catalyst 62, thereby becoming treated gases, represented by arrows 68. Treated exhaust gases 68 pass into a chamber 70, whereupon they are forced to take a turn and proceed through a port 72 in separator member 52. Treated exhaust gases 68 take another turn in chamber 74, and proceed out of a plurality of pie-shaped apertures 76, which are best shown in FIG. 4. Ribs 78 (FIG. 4) separate apertures 76 from each other.

To minimize the back pressure on the venturi, the noise attenuator is disposed upstream of the catalyst. Back pressure is also minimized by designing exhaust aperture 76 such that the combined cross-sectional areas in a direction transverse to the flow of treated gases 68 is substantially equal to the cross-sectional area of catalyst 62 in the direction transverse to the flow of gases 38. Back pressure on the venturi is also minimized by designing port 72 and deflector 20 such that their respective cross-sectional areas in the direction transverse to the flow of gases 68 are also substantially equal to the cross-sectional area of catalyst 62 in a direction transverse to the flow of untreated gases 38.

Catalytic muffler 10 as depicted in FIG. 3 includes an optional heat shield 16, which is kept in spaced relation from cover 18 by a plurality of protrusions 80 which extend from cover 18. Protrusions 80 insure that a small air gap 82 remains between cover 18 and heat shield 16, so that the temperature of heat shield 16 will always be substantially less than the temperature of cover 18.

Since venturi 54 is formed from metal stamped parts, it is necessary to prevent the stamped parts from bending during the assembly of the catalytic converter. To prevent this bending and to retain the desired dimensions of venturi 54, it is desirable to form the ends of the stamped components such that they are substantially straight so that the components do not bend when they are joined into a junction.

This feature is best shown in FIGS. 3 and 5. As shown in these figures, body 14, separator member 52, and cover 18 are all joined together in a junction 84, wherein they are held by heat shield 16. The respective ends of body 14, separator member 52, and cover 18 are substantially straight; that is, they are substantially parallel to centerline 56.

As discussed above, an important feature of the present invention is that venturi device 54 is made from two stamped components. This design yields a venturi having a flattened profile; that is, the venturi has a width dimension which is substantially greater than its height dimension. These dimensions of the venturi are best understood with reference to FIG. 7. In FIG. 7, venturi 54 has a width dimension w which is at least 4 times greater than its minimum height dimension, the height dimension h being defined as the distance between the two stamped components 14 and 52. In the preferred embodiment, height dimension h may have a minimum value of 0.158 inches, and may vary up to a value of 0.297 inches at the diverging end of venturi 54. The selected minimum height dimension is a function of the amount of secondary air which is to be drawn into the venturi through apertures 32. The more secondary air that is to be drawn in through apertures 32, the smaller the height dimension.

Width dimension w is somewhat dependent upon space limitations. If we assume that the minimum height dimension or convergent distance is 0.158 inches as in the preferred embodiment discussed herein, the width dimension is approximately 1.750 inches. However, the width dimension could be as small as about 0.75 inches and as large as 5 or more inches, with height dimension h being changed proportionally from about 0.368 to about 0.0553 inches respectively. The h by w area is dependent upon the engine exhaust output; however, the venturi will not function properly if the h by w area is too large.

To insure that secondary air is properly drawn into venturi 54, it is desirable that apertures 32 have a inclined or canted profile, and extend approximately 40% to 60% of the distance h between the stamped components 14 and 52, with 50% of the distance being preferred. This position and configuration of apertures 32 is desirable to insure that secondary air is properly drawn in through the apertures and that no significant amounts of untreated exhaust gases pass out of apertures 32.

The position and configuration of apertures 32 is best shown in FIG. 9. In FIG. 9, apertures 32 are positioned at approximately the midway point between body 14 and separator 52; that is, near centerline 56. Also, the upstream or fore portion 32a of each of apertures 32 is somewhat closer to separator 52 than the downstream or aft portion 32b of each of apertures 32.

As discussed above in connection with FIG. 2, a dam 34 is formed to prevent the untreated exhaust gases from approaching the venturi from certain angles. As best shown in FIG. 8, dam 34 is formed by a depression 34a in cover 14 and a corresponding depression 34b in separator member 52. The proximity of depressions 34a and 34b prevents any significant amount of untreated exhaust gases from passing between the depressions, thereby forcing the exhaust gases to take a different route to venturi 54.

Although a preferred embodiment of the present invention has been shown or described, alternate embodiments will be apparent to those skilled in the art and are within the intended scope of the present invention. Therefore, the invention is to be limited only by the following claims.

What is claimed is:

1. A catalytic converter for treating the exhaust gases of an internal combustion engine, comprising:
   a converter housing;
   means, at least partially disposed within said housing, for receiving exhaust gases from said engine;
   a member, disposed within said housing, that divides said housing into at least two chambers;
   a venturi device, disposed within said housing, that is formed from said housing and said dividing member;
   a catalyst, disposed within said housing, through which said exhaust gases pass; and
   means for outputting said exhaust gases after said gases have passed through said catalyst.

2. The catalytic converter of claim 1, further comprising:
   attenuation means, disposed within said housing, for reducing the noise of said exhaust gases.

3. The catalytic converter of claim 2, wherein said attenuation means is disposed upstream of said venturi device.

4. The catalytic converter of claim 2, wherein said attenuation means includes a plate having a plurality of spaced apertures therein.

5. The catalytic converter of claim 1, wherein said venturi device includes a means for drawing in secondary air.

6. The catalytic converter of claim 5, wherein said air drawing means includes a plurality of apertures in said converter housing.

7. The catalytic converter of claim 1, wherein said venturi device has a width dimension that is substantially greater than a height dimension of said venturi device.

8. The catalytic converter of claim 7, wherein said width dimension is at least four times greater than said height dimension.

9. The catalytic converter of claim 8, wherein the height dimension of said venturi device is less than 0.20 inches at its smallest point, and said width dimension is at least 0.75 inches.

10. The catalytic converter of claim 1, wherein the cross-sectional area of said catalyst in a direction transverse to a direction of gas flow through said catalyst is substantially equal to the cross-sectional area of said gas output means in a direction transverse to a direction of gas flow through said output means.

11. A catalytic converter that treats the exhaust gases of an internal combustion engine, comprising:
    a first stamped member;
    a second stamped member;
    means for receiving exhaust gases from said engine;
    a venturi device having a first sidewall that consists of a portion of said first stamped member and having a second sidewall that consists of a portion of said second stamped member;
    a catalyst through which said exhaust gases pass; and
    a means for outputting said exhaust gases after said gases have passed through said catalyst.

12. The catalytic converter of claim 11, further comprising:
    a plurality of apertures in said first stamped member that receive secondary air.

13. The catalytic converter of claim 12, wherein said venturi device has a width dimension that is substantially greater than a height dimension of said venturi device.

14. The catalytic converter of claim 13, wherein said width dimension is at least four times greater than said height dimension.

15. The catalytic converter of claim 14, wherein said height dimension is less than 0.20 inches at its smallest point, and wherein said width dimension is at least 0.75 inches.

16. The catalytic converter of claim 11, wherein the cross-sectional area of said catalyst in a direction transverse to a direction of gas flow through said catalyst is substantially equal to the cross-sectional area of said gas output means in a direction transverse to a direction of gas flow through said output means.

* * * * *

UNITED STATES PATENT AND TRADEMARK OFFICE
CERTIFICATE OF CORRECTION

PATENT NO. : 5,548,955
DATED : August 27, 1996
INVENTOR(S) : Parrish A. Sandefur and William M. Kindness It is certified that error appears in the above—identified patent and that said Letters Patent is hereby corrected as shown below:

Column 6, line 62, "12" should be --11--

Signed and Sealed this

Fourth Day of February, 1997

Attest:

BRUCE LEHMAN

*Attesting Officer*  *Commissioner of Patents and Trademarks*